No. 774,751. PATENTED NOV. 15, 1904.
F. W. HACKMANN.
AUTOMATIC STOP FOR ELEVATORS.
APPLICATION FILED MAY 16, 1904.
NO MODEL. 2 SHEETS—SHEET 1.
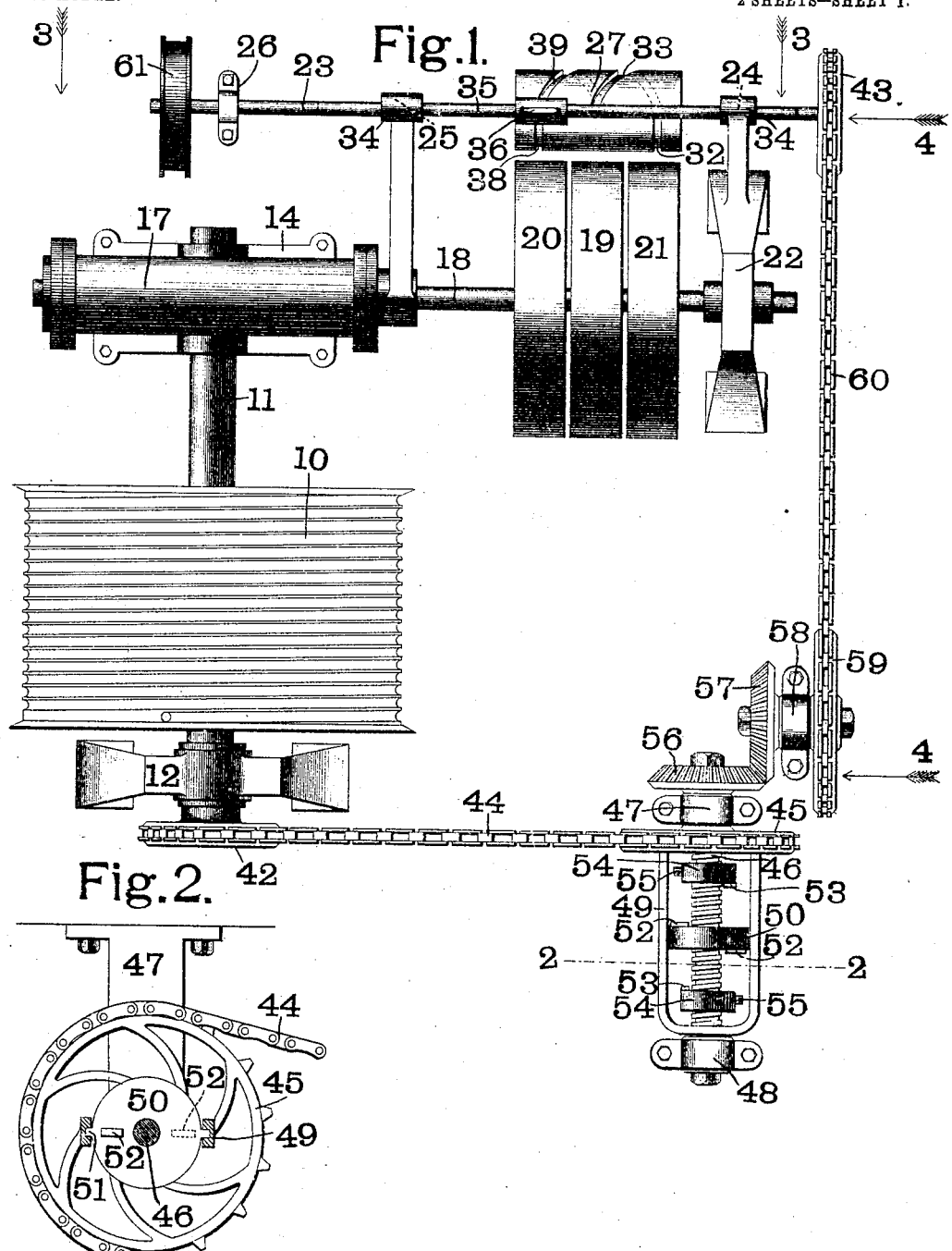
Witnesses
W. A. Alexander
Fred Henke
Inventor
F. W. Hackmann.
By Attorneys No. 774,751. PATENTED NOV. 15, 1904.
F. W. HACKMANN.
AUTOMATIC STOP FOR ELEVATORS.
APPLICATION FILED MAY 16, 1904.
NO MODEL. 2 SHEETS—SHEET 2.

Witnesses
W. A. Alexander
Fred H. Henke

Inventor
F. W. Hackmann.
By Attorneys

No. 774,751.                                                    Patented November 15, 1904.

UNITED STATES PATENT OFFICE.

FREDERICK W. HACKMANN, OF ST. LOUIS, MISSOURI.

AUTOMATIC STOP FOR ELEVATORS.

SPECIFICATION forming part of Letters Patent No. 774,751, dated November 15, 1904.

Application filed May 16, 1904. Serial No. 208,087. (No model.)

*To all whom it may concern:*

Be it known that I, FREDERICK W. HACKMANN, a citizen of the United States, residing at the city of St. Louis, in the State of Missouri, have invented a certain new and useful Automatic Stop for Elevators, of which the following is such a clear, full, and exact description as will enable any one skilled in the art to which it appertains to make and use the same, reference being had to the accompanying drawings, forming part of this specification.

My invention relates to automatic stops for elevators, such as are used for shifting the belt or other power-transmitting devices to automatically stop an elevator when it has reached either end of its travel.

The main object of my invention is to so construct an automatic device that it can be readily applied to the usual type of freight-elevators now in use, which are not usually provided with an automatic stop dvice.

Figure 3:
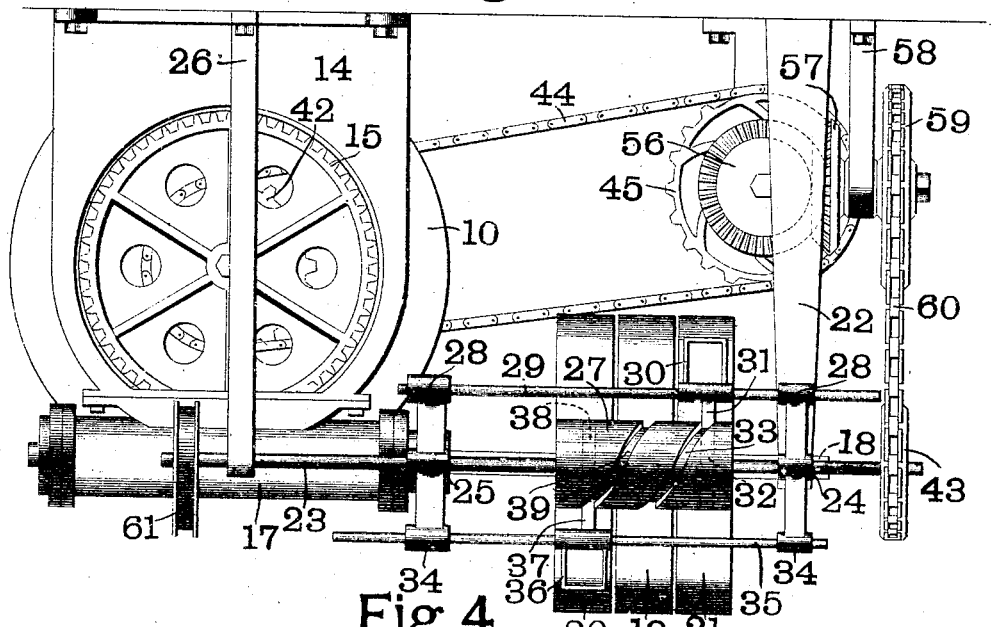
Figure 4:
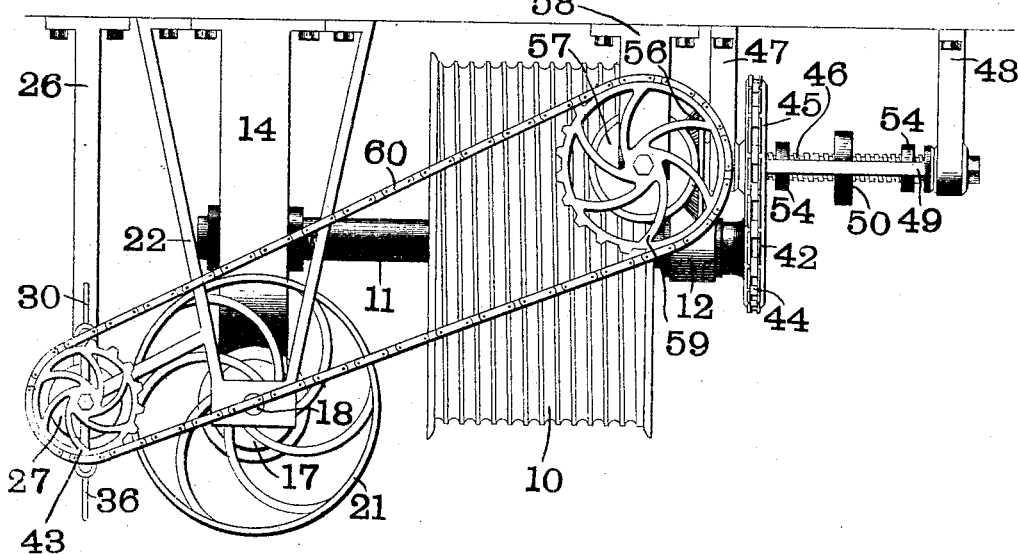

In the accompanying drawings, which illustrate one form of elevator-driving gear provided with an automatic stop device made in accordance with my invention, Figure 1 is a bottom plan view. Fig. 2 is an enlarged section on the line 2 2 of Fig. 1. Fig. 3 is a side elevation looking in the direction of the arrows 3 3 of Fig. 1, and Fig. 4 is a side elevation looking in the direction of the arrows 4 4 of Fig. 1.

Like marks of reference refer to similar parts of the several views of the drawings.

10 is a winding-drum from which the rope or cable passes to the elevator-car. This drum 10 is carried on a shaft 11, journaled at one end in a hanger 12 and at the other in a casing 14, containing a worm-wheel 15. The worm-wheel 15 is driven by the worm in a casing 17, secured to the lower part of the casing 14.

18 is the worm-shaft, upon which are mounted the fixed pulley 19 and two loose pulleys 20 and 21, respectively. The opposite end of the shaft 18 is journaled in a hanger 22.

23 is a cam-shaft. This cam-shaft 23 is journaled in bearings 24 and 25, carried, respectively, by the hanger 22 and by the end of the worm-case 17. The shaft 23 is also supported by a hanger 26. Mounted on the cam-shaft 23 is a belt-shifting cam 27. The bearings 24 and 25 are provided with upward extensions carrying bearings 28, in which slides a shifting rod 29. This shifting rod 29 carries the belt-shifter 30 for shifting one of the belts from the loose pulley 21 to the fixed pulley 19. The belt-shifter 30 is provided with a downwardly-extending pin 31, which works in the groove in the shifting-cam 27. This groove is composed of a straight part 32 and the inclined part 33, so that when the cam 27 is moved in one direction the pin 31 will move in the straight part 32 and the shifter will remain stationary, while if the cam is moved in the opposite direction the pin 31 will move in the inclined groove 33 and shift the belt from the loose pulley 21 to the fixed pulley 19, or vice versa. Extending downward from the bearings 24 and 25 are bearings 34, in which slides a second shifting rod 35. This shifting rod 35 is provided with a belt-shifter 36, similar to the belt-shifter 30, and is provided with an upwardly-extended pin 37, which works in a second groove in the cam 27. This second groove also consists of a straight part 38 and an inclined part 39. When the cam 27 is moved in such a direction that pin 31 works in the straight part 32 of the first groove, the pin 37 will move in the inclined part 39 of the second groove, and thus when one belt-shifter is stationary the other will be movable.

The above-described parts are old and are such as are in common use on freight-elevators at the present time.

In order to provide the device with an automatic stop, I secure to the end of the drum-shaft 11 a sprocket-wheel 42 and to the end of the cam-shaft 23 the sprocket-wheel 43.

44 is a sprocket-chain extending around the sprocket-wheel 42 and around a sprocket-wheel 45. This sprocket-wheel 45 is loosely mounted on one end of a threaded shaft 46. This shaft 46 is mounted in hangers 47 and 48.

49 is a yoke rigidly secured to the sprocket-wheel 45 and loosely journaled at the opposite end of the shaft 46. The portion of the shaft intermediate of the sprocket-wheel 45 and the end of the yoke 49 is screw-threaded and passes through a nut 50. This nut 50 is provided with projections 51, (best shown in Fig. 2,) which work in grooves in the inner faces of the sides of the yoke 49, so that the nut turns with said yoke. The nut is also provided with projections 52, adapted to come in contact with projections 53, carried by stops 54, rigidly secured to the shaft 46 by means of set-screws 55. Secured to the end of the shaft 46 is a bevel gear-wheel 56. This beveled gear-wheel 56 meshes with a similar beveled gear 57, journaled in a hanger 58. Rigidly secured to the shaft of the beveled gear 57 is a sprocket-wheel 59, which is connected, by means of a sprocket-chain 6, with the sprocket-wheel 43 on the end of the cam-shaft 23.

At the opposite end of the cam-shaft 23 from the sprocket-wheel 43 is the usual rope-wheel 61, by means of which the belt-shifting device is operated from the car of the elevator.

The operation of my device is as follows: As the drum 10 rotates to raise or lower the elevator the sprocket-wheel 45, together with yoke 49, will be rotated by means of the sprocket-chain 44, and this will cause the nut 50 to travel along the shaft 46 in one direction or the other. As soon as the nut 50 reaches the end of its travel one of the projections 52 will come in contact with the projection 53 on one of the stops 54, and will thus rotate the shaft 46. This through the beveled gear-wheels 56 and 57 will rotate the sprocket-wheel 59 and through the sprocket-chain 60 will rotate the sprocket-wheel 43, and consequently the cam-shaft 23, so that the cam 27 will be rotated to shift the belt, which is on the fixed pulley 19, either to the loose pulley 20 or the loose pulley 21, according as the elevator is moving in one direction or the other. At any time it is desired to start or stop the car the same can be done by means of the usual rope-wheel 61 without moving the sprocket-chain 44, as the shaft 46 will merely turn in the nut 50 and move it a slight distance in one direction or the other.

It will be evident that my device is simple in construction, but effective in operation, and that it can be readily attached to any of the usual forms of driving-gear for freight-elevators in which the driving-shaft and belt-shifting shaft are arranged at right angles to the drum-shaft.

Having fully described my invention, what I claim as new, and desire to secure by Letters Patent of the United States, is—

1. The combination with an elevator-drum, of driving devices arranged at right angles to the shaft of said drum, belt-shifting devices for and arranged parallel to said driving devices, an automatic device, gearing for driving said automatic device from the shaft of said drum, and connections between said automatic device and said belt-shifting devices.

2. The combination with an elevator-drum, of driving devices arranged at right angles to the shaft of said drum, belt-shifting devices for and arranged parallel to said driving devices, an automatic device, gearing for driving said automatic device, a bevel-gear driven by said automatic device, a second bevel-gear driven by said first bevel-gear, and gearing connecting said second bevel-gear with said belt-shifting devices.

3. The combination with an elevator-drum, of driving devices arranged at right angles to the shaft of said drum, belt-shifting devices for and arranged parallel to said driving devices, an automatic device, sprocket-gearing for driving said automatic device, a bevel-gear driven by said automatic device, a second bevel-gear driven by said first bevel-gear, and sprocket-gearing connecting the said second bevel-gear with the belt-shifting devices.

4. The combination with belt-shifting devices of an elevator, of a normally stationary threaded shaft, a frame loosely mounted on said shaft, a nut threaded on said shaft and slidingly connected with said frame, means carried by said nut for engaging and rotating said shaft, means for rotating said frame, and operating connections between said shaft and belt-shifting devices.

5. The combination with the belt-shifting devices of an elevator, of a normally stationary threaded shaft, a frame loosely mounted on said shaft, a nut threaded on said shaft and slidingly connected with said frame, means carried by said nut for engaging and rotating said shaft, means for rotating said frame, a bevel-gear carried by said shaft, a second bevel-gear meshing with said first bevel-gear, and operating connections between said second gear and said belt-shifting devices.

6. The combination with an elevator-drum, of driving devices arranged at right angles to said drum, belt-shifting devices for said driving devices, a normally stationary threaded shaft, a frame loosely mounted on said shaft, a nut threaded on said shaft and slidingly connected with said frame, means carried by said nut for engaging and rotating said threaded shaft, gearing for rotating said frame from the shaft of said drum, and angular gearing connecting said threaded shaft with said belt-shifting devices.

7. The combination with an elevator-drum, of driving devices arranged at right angles to said drum, belt-shifting devices for said driving devices, a normally stationary threaded shaft, a frame loosely mounted on said shaft, a nut threaded on said shaft and slidingly connected with said frame, means carried by said nut for engaging and rotating said threaded shaft, sprocket-gearing for rotating said frame from the shaft of said drum, angular gearing driven by said frame, and sprocket-gearing connecting said angular gearing with said belt-shifting devices.

In testimony whereof I have hereunto set my hand and affixed my seal in the presence of the two subscribing witnesses.

FREDERICK W. HACKMANN. [L. S.]

Witnesses:
W. A. ALEXANDER,
D. C. BETJEMAN.